(12) United States Patent
Hanada et al.

(10) Patent No.: US 9,297,144 B2
(45) Date of Patent: Mar. 29, 2016

(54) WORK MACHINE

(71) Applicant: KOBELCO CONSTRUCTION MACHINERY CO., LTD., Hiroshima-shi (JP)

(72) Inventors: Eiichi Hanada, Hiroshima (JP); Hiroshi Kanamaru, Hiroshima (JP)

(73) Assignee: KOBELCO CONSTRUCTION MACHINERY CO., LTD., Hiroshima-shi (JP)

( * ) Notice: Subject to any disclaimer, the term of this patent is extended or adjusted under 35 U.S.C. 154(b) by 0 days.

(21) Appl. No.: 14/525,732

(22) Filed: Oct. 28, 2014

(65) Prior Publication Data

US 2015/0114748 A1    Apr. 30, 2015

(30) Foreign Application Priority Data

Oct. 31, 2013 (JP) ................................. 2013-226988

(51) Int. Cl.
```
E02F 9/08      (2006.01)
E02F 9/18      (2006.01)
B60K 11/06     (2006.01)
F01P 5/06      (2006.01)
```

(52) U.S. Cl.
CPC ............... *E02F 9/0866* (2013.01); *B60K 11/06* (2013.01); *E02F 9/18* (2013.01); *F01P 5/06* (2013.01); *B60Y 2200/412* (2013.01)

(58) Field of Classification Search
CPC ............. E02F 9/0866; E02F 9/18; F01P 5/06; B60K 11/06; B60Y 2200/412
USPC .................................................. 180/68.1, 309
See application file for complete search history.

(56) References Cited

U.S. PATENT DOCUMENTS

| | | | |
|---|---|---|---|
| 6,026,768 A * | 2/2000 | Spitler et al. ............... | 123/41.58 |
| 2001/0007292 A1 | 7/2001 | Yabf | |
| 2005/0241874 A1* | 11/2005 | Jacquemont et al. ......... | 180/309 |
| 2008/0223319 A1* | 9/2008 | Nakashima et al. ....... | 123/41.66 |

(Continued)

FOREIGN PATENT DOCUMENTS

| | | |
|---|---|---|
| EP | 2 581 502 A1 | 4/2013 |
| EP | 2 746 087 A1 | 6/2014 |

(Continued)

OTHER PUBLICATIONS

Extended European Search Report issued Mar. 13, 2015 in Patent Application No. 14191003.4.

*Primary Examiner* — Brodie Follman
*Assistant Examiner* — Brian Cassidy
(74) *Attorney, Agent, or Firm* — Oblon, McClelland, Maier & Neustadt, L.L.P.

(57) ABSTRACT

A work machine includes a machine body, the machine body includes a bottom plate having an air outlet, and an exhaust air duct, the air outlet includes a major opening portion and a wide portion that is disposed with the major opening portion side by side in a left and right direction, the wide portion including a portion located immediately under an engine and having a greater width in a front and rear direction than a width of the major opening portion in the front and rear direction, the exhaust air duct includes a duct base portion including a lower opening that communicates with the air outlet, and an extension portion having an upper opening that is provided at an upper end thereof, and the duct base portion includes a wide-portion covering portion that covers the wide portion at a position immediately under the engine.

5 Claims, 11 Drawing Sheets

(56) References Cited

U.S. PATENT DOCUMENTS

| | | |
|---|---|---|
| 2013/0081887 A1* | 4/2013 | Tsuchihashi et al. ........ 180/68.1 |
| 2013/0094895 A1 | 4/2013 | Kanamaru |
| 2013/0309955 A1* | 11/2013 | Wang et al. ................... 454/152 |
| 2014/0151139 A1* | 6/2014 | Rizzon et al. ................ 180/68.1 |
| 2014/0166380 A1* | 6/2014 | Numasawa ................. 180/68.1 |
| 2014/0311816 A1* | 10/2014 | Shiraishi et al. .............. 180/309 |
| 2015/0114748 A1* | 4/2015 | Hanada et al. ................ 180/309 |

FOREIGN PATENT DOCUMENTS

| | | |
|---|---|---|
| GB | 2 358 165 A | 7/2001 |
| JP | 2013-39895 | 2/2013 |

* cited by examiner

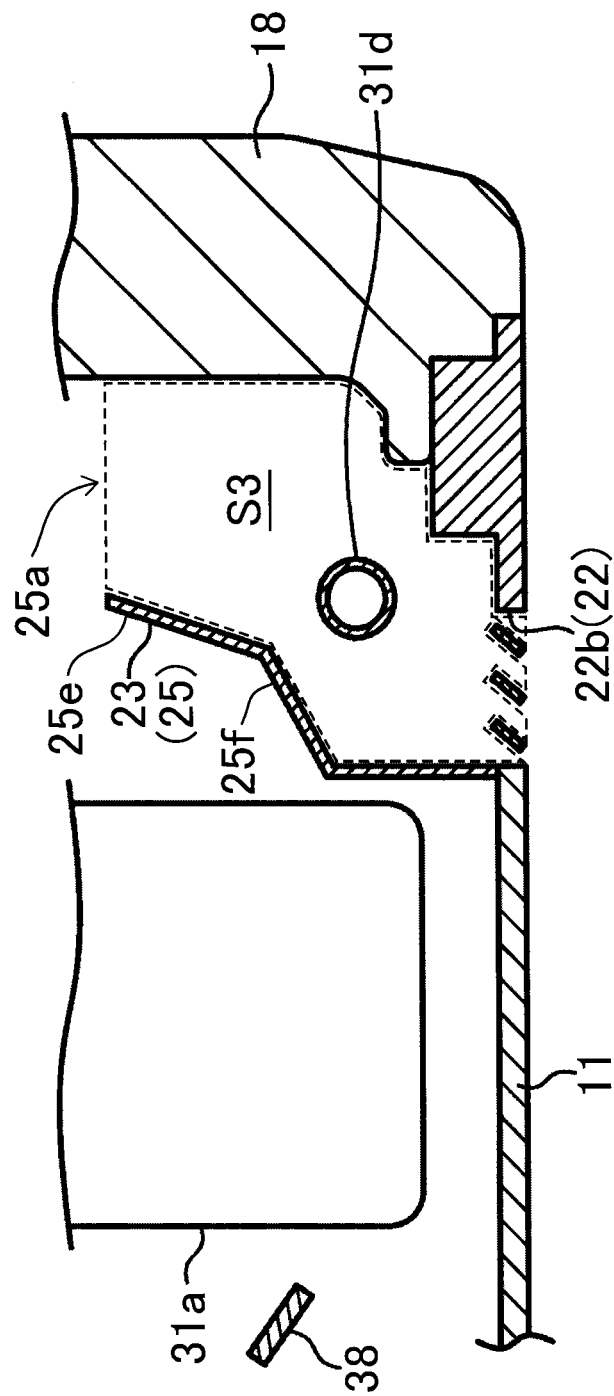

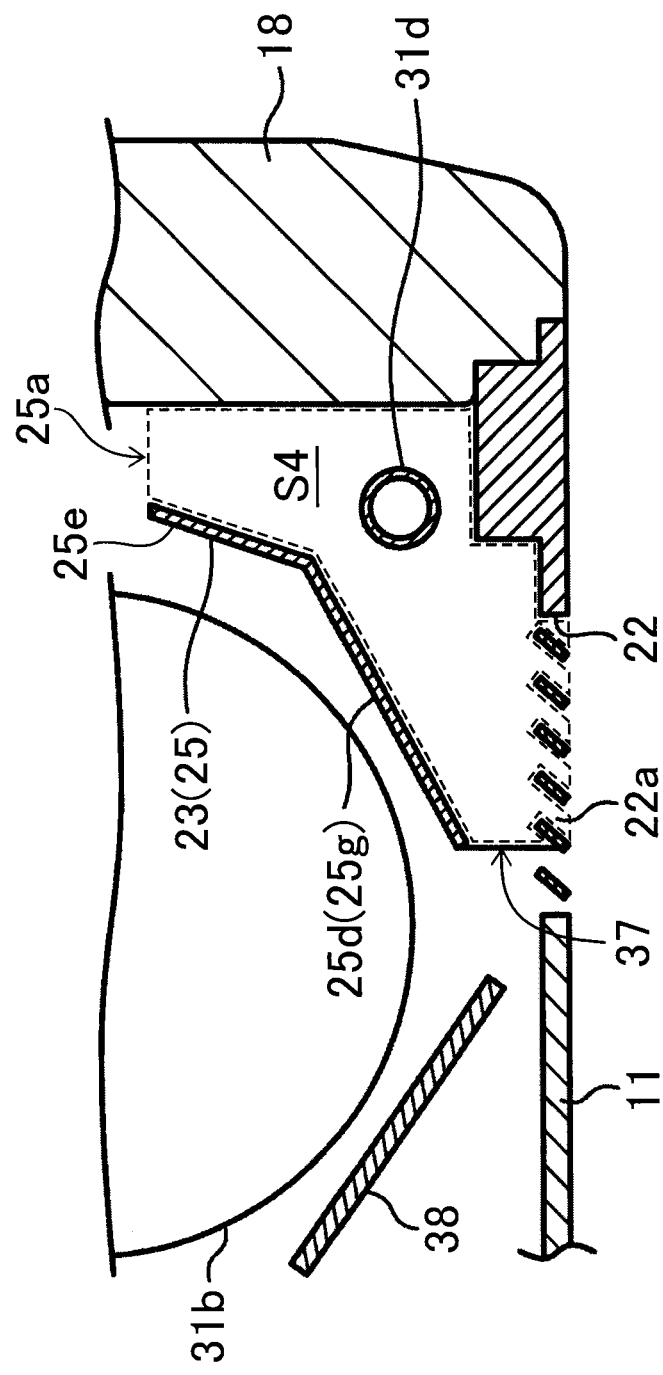

WORK MACHINE

TECHNICAL FIELD

The present invention relates to a work machine.

BACKGROUND ART

Japanese Unexamined Patent Publication No. 2013-39895 discloses an example of work machines which includes a duct structure used for guiding an air flow flowing in an engine room to an outlet that is open in a bottom plate forming a bottom surface of the engine room.

In the engine room of the work machine disclosed in Japanese Unexamined Patent Publication No. 2013-39895, an engine is laterally disposed in the left and right direction. An inlet, a heat exchanger, and an axial fan are disposed on the right side of the engine. The heat exchanger is cooled down by outer air taken in from the inlet due to the rotation of the axial fan.

An exhaust air duct having a laterally long box shape is provided so as to extend along a bottom portion of a front section of the engine. The exhaust air duct includes a plurality of board walls each forming a corresponding one of front, rear, left, and right end portions. A ventilation flue that is surrounded by the plurality of board walls and has a rectangular cross section is formed inside the exhaust air duct. Upper and lower ends of the exhaust air duct are open. An upper end opening of the exhaust air duct serves as an air introducing port. A lower end opening of the exhaust air duct serves as an air outlet. The air outlet is connected to the rectangular outlet that is open in the bottom plate forming the bottom surface of the engine room.

The axial fan rotates clockwise when viewed from the right side thereof. Accordingly, the axial fan generates an air flow that swirls around the engine, introduces the generated air flow into the exhaust air duct from the air introducing port, and discharges the air from the outlet. Thus, the exhaust efficiency of the engine room is increased.

Due to integration of devices, and the like, in associations with the reduction in size of work machines, it is difficult to ensure a large space in an engine room. Under the circumstances, the exhaust efficiency directly influences heat exchange, and therefore, it is an important object to achieve in increasing the cooling performance of an engine, or the like, to increase the exhaust efficiency of the engine room.

In this point, in the above-described exhaust air duct, the air introducing port is formed open upward so as to be opposed to a flow of air and has a large size such that the length of the air introducing port corresponds to approximately the entire length of the engine. Moreover, the cross-sectional area of the ventilation flue including the air outlet and the outlet is equal to or larger than the area of the air introducing port. Thus, air can be efficiently introduced into the exhaust air duct with low ventilation resistance.

However, if there is not enough space in front of the engine, the exhaust air duct of Japanese Unexamined Patent Publication No. 2013-39895 cannot be disposed. Specifically, because the engine has a complex shape in which a plurality of parts are combined, the exhaust air duct has to be disposed so as to be separate from a most protruding part of the engine. Therefore, a dead space is disadvantageously generated around the engine.

SUMMARY OF INVENTION

It is therefore an object of the present invention is to provide a work machine in which air can be efficiently discharged from a bottom portion of an engine room efficiently utilizing a limited space in an engine room.

A work machine according to an aspect of the invention includes a lower propelling body, and a machine body mounted on the lower propelling body, the machine body including an engine room in a rear portion thereof, wherein the machine body includes: a bottom plate that forms a bottom surface of the engine room and has an air outlet formed therein; a fan that is installed in the engine room to generate an air flow flowing in a left and right direction of the machine body in the engine room; an engine that has a drive shaft and is laterally disposed in the engine room such that the drive shaft extends in the left and right direction of the machine body; and an exhaust air duct that is installed in the engine room to guide the air flow to the air outlet, the air outlet includes a major opening portion that extends along a lower portion of a rear portion of the engine in the left and right direction of the machine body, and a wide portion that is disposed with the major opening portion side by side in the left and right direction of the machine body so as to be connected to the major opening portion, the wide portion including a portion located immediately under the engine and having a greater width in a front and rear direction of the machine body than a width of the major opening portion in a front and rear direction of the machine body, the exhaust air duct includes a duct base portion that is installed on the bottom plate so as to cover the air outlet, the duct base portion including a lower opening that is provided at a lower end of the duct base portion to communicate with the air outlet, and an extension portion that extends upward from the duct base portion at a position behind the engine and has an upper opening that is provided at an upper end thereof and is open upward, the exhaust air duct defines a ventilation flue in the exhaust air duct, the ventilation flue communicating the upper opening with the lower opening between the upper opening and the lower opening, and the duct base portion includes a wide-portion covering portion that covers the wide portion at a position immediately under the engine.

BRIEF DESCRIPTION OF DRAWINGS

FIG. 7C is a schematic cross-sectional view taken along the line C-C of FIG. 4;

FIG. 7D is a schematic cross-sectional view taken along the line D-D of FIG. 4.

DESCRIPTION OF EMBODIMENTS

Embodiments of the present invention will be described in detail below with reference to the accompanying drawings. The following description is merely exemplary in nature and is not intended to limit the present invention, application of the present invention, or uses of the present invention.

Figure 1:
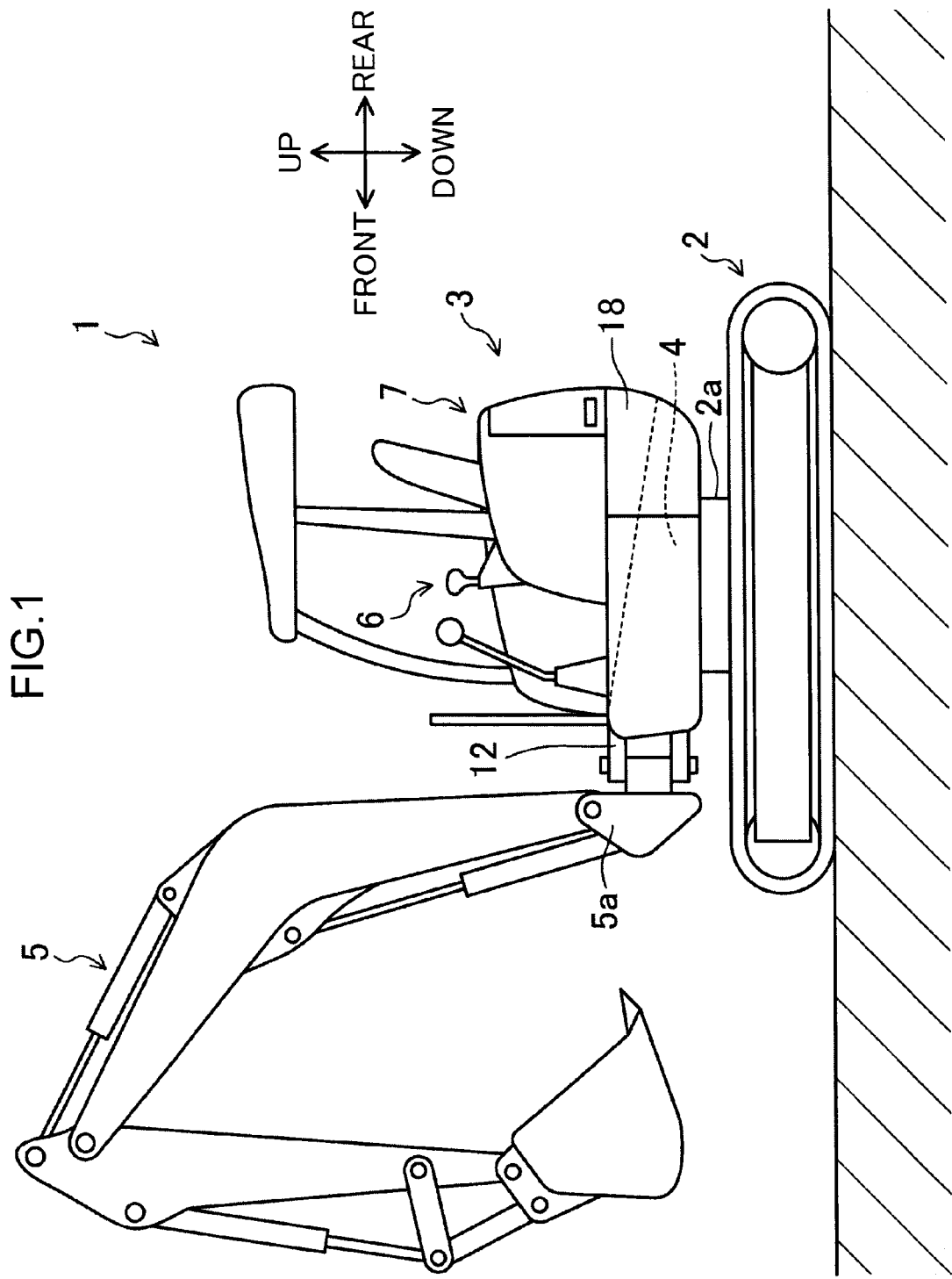
FIG. 1 is a schematic side view of a hydraulic shovel according to an embodiment of the present invention.

FIG. 1 illustrates a hydraulic shovel 1 according to one embodiment of the present invention. The hydraulic shovel 1 is an example work machine according to the present invention. The hydraulic shovel 1 is a small-sized model having a machine mass of 5 t or less. That is, the hydraulic shovel 1 is a so-called mini shovel. The hydraulic shovel 1 includes a lower propelling body 2 including a pair of crawlers that enable the hydraulic shovel 1 to freely travel, and a machine body 3 mounted on the lower propelling body 2 so as to freely swing.

The machine body 3 includes an upper frame 4, an attachment 5, an operator's seat 6, an engine room 7, a counter weight 18, an exhaust air duct 25, an engine 31, a heat exchanger 32, an axial fan 33, a hydraulic pump 34, and the like.

The upper frame 4 is disposed in a lower portion of the machine body 3. The attachment 5 is installed in a front portion of the machine body 3. The engine room 7 is disposed in a rear portion of the machine body 3. The operator's seat 6 is installed so as to be adjacent to the engine room 7 in the front and rear direction. The operator's seat 6 is installed in an approximately central portion of the machine body 3.

Note that the directions, such as up, down, left, right, front, rear, and the like, used herein are indicated by arrows in each drawing. These directions are defined using the machine body 3 as a reference.

The attachment 5 includes a boom, an arm, a bucket, and the like. The attachment 5 is a work device that performs on the basis of hydraulic control a work operation in accordance with an operation of an operator. The attachment 5 of the model of this embodiment is supported by the upper frame 4 via a swing bracket 5a so as to be capable of swinging in the left and right direction.

Figure 2:
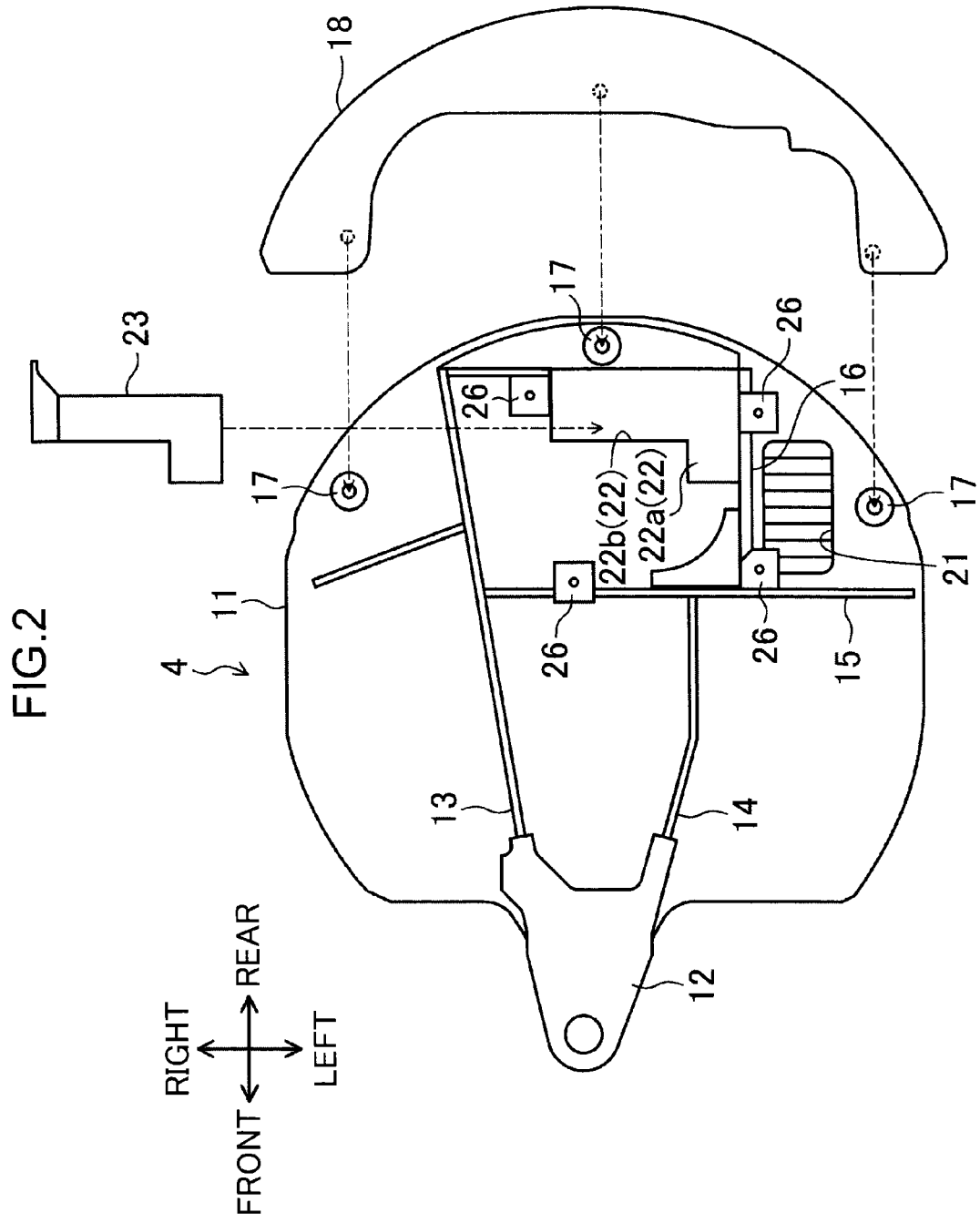
FIG. 2 is a schematic plan view illustrating mutual assembly of an upper frame, a counter weight, and a duct cover.

As illustrated in FIG. 2, the upper frame 4 includes a bottom plate 11, a plurality of vertical plates 13, 14, and 16, a beam plate 15, and the like. Each of these plates is made of a metal plate with a large thickness, which is excellent in strength and stiffness. These plates are integrated as a single unit by welding, and thus, the upper frame 4 is also structurally strengthened.

A central portion of the bottom plate 11 is supported by the lower propelling body 2 via a swing bearing 2a. A bracket support member 12 that supports the swing bracket 5a is installed in a front portion of the bottom plate 11. The first vertical plate 13 and the second vertical plate 14 extend rearward from the bracket support member 12. The first vertical plate 13 and the second vertical plate 14 face each other in the left and right direction. The bottom plate 11 has a rear end edge formed in an approximately circular arc shape. A rear end of the first vertical plate 13 is located near the rear end edge of the bottom plate 11. A rear end of the second vertical plate 14 is located at an intermediate position in the bottom plate 11 in the front and rear direction. Specifically, the rear end of the second vertical plate 14 is located approximately at the center of the bottom plate 11 in the front and rear direction.

The beam plate 15 is provided at an intermediate position in the bottom plate 11 in the front and rear direction, more specifically, approximately at the center of the bottom plate 11 in the front and rear direction. The beam plate 15 extends in the left and right direction. A right end of the beam plate 15 is joined to a left side surface of the first vertical plate 13. The rear end of the second vertical plate 14 is joined to a front face of the beam plate 15. A left end of the beam plate 15 is located in the vicinity of a left side end edge of the bottom plate 11. The third vertical plate 16 extends rearward from a portion of a rear face of the beam plate 15 located on the left side of a joint region of the beam plate 15 with the second vertical plate 14.

Three weight pedestals 17 are installed in the bottom plate 11. Two of the three weight pedestals 17 are installed separately from each other at two positions in the bottom plate 11 on a rear side of this plate. The other one of the weight pedestals 17 is installed at a rear end portion of the bottom plate 11. Specifically, the other one of the weight pedestals 17 is installed at a position in the bottom plate 11 located between the first vertical plate 13 and the third vertical plate 16 and near the rear end edge of the bottom plate 11. The counter weight 18 is assembled on the three weight pedestals 17.

The counter weight 18 is made of a cast. The counter weight 18 has a high weight. The counter weight 18 is installed in the rear portion of the machine body 3. Thus, the counter weight 18 keeps a weight balance with the attachment 5 in the front and rear direction and functions as a cover that covers a rear portion of the engine room 7. In the model of this embodiment, the engine room 7 is basically made of a space between the counter weight 18 and the beam plate 15. The counter weight 18 has an inner wall surface 18a facing an inner side of the machine body 3.

The rear portion of the bottom plate 11 forms a bottom surface of the engine room 7. A first air outlet 21 is formed in a rear corner portion of the rear portion of the bottom plate 1, which is located on the left side of the third vertical plate 16. Furthermore, a second air outlet 22 is formed in a portion of the rear portion of the bottom plate 11 located between the first vertical plate 13 and the third vertical plate 16.

The second air outlet 22 is an opening having a laterally long shape extending, basically, along a rear edge of the bottom plate 11 in the left and right direction. The second air outlet 22 is open in a range extending from a position in the bottom plate 11, which is located behind the engine 31 to a position in the bottom plate 11, which is located immediately under the engine 31. The second air outlet 22 includes a major opening portion 22b and a wide portion 22a.

The major opening portion 22b extends along a lower portion of a rear portion of the engine 31 in the left and right direction. The wide portion 22a is disposed with the major opening portion 22b side by side in the left and right direction. The wide portion 22a is connected to a left end of the major opening portion 22b. The wide portion 22a is disposed in a left end portion of the second air outlet 22. The wide portion 22a is disposed in a position located at a leeward side relative to the major opening portion 22b in a state where an air flow is generated by the axial fan 33 as described below. That is, the wide portion 22a is disposed at a position which is more distant from the axial fan 33 than the major opening portion 22b in a direction in which the axial fan 33 blows.

The wide portion 22a has a larger width in the front and rear direction than the width of the major opening portion 22b in the front and rear direction. The position of a rear end of the wide portion 22a in the front and rear direction corresponds to the position of a rear end of the major opening portion 22b in the front and rear direction. The front portion of the wide portion 22a protrudes further frontward from a front end of the major opening portion 22b. The wide portion 22a has a portion located immediately under the engine 31. That is, a range extending from a front end of the wide portion 22a to the approximate center of the wide portion 22a in the front and rear direction is located immediately under the engine 31.

Figure 3:
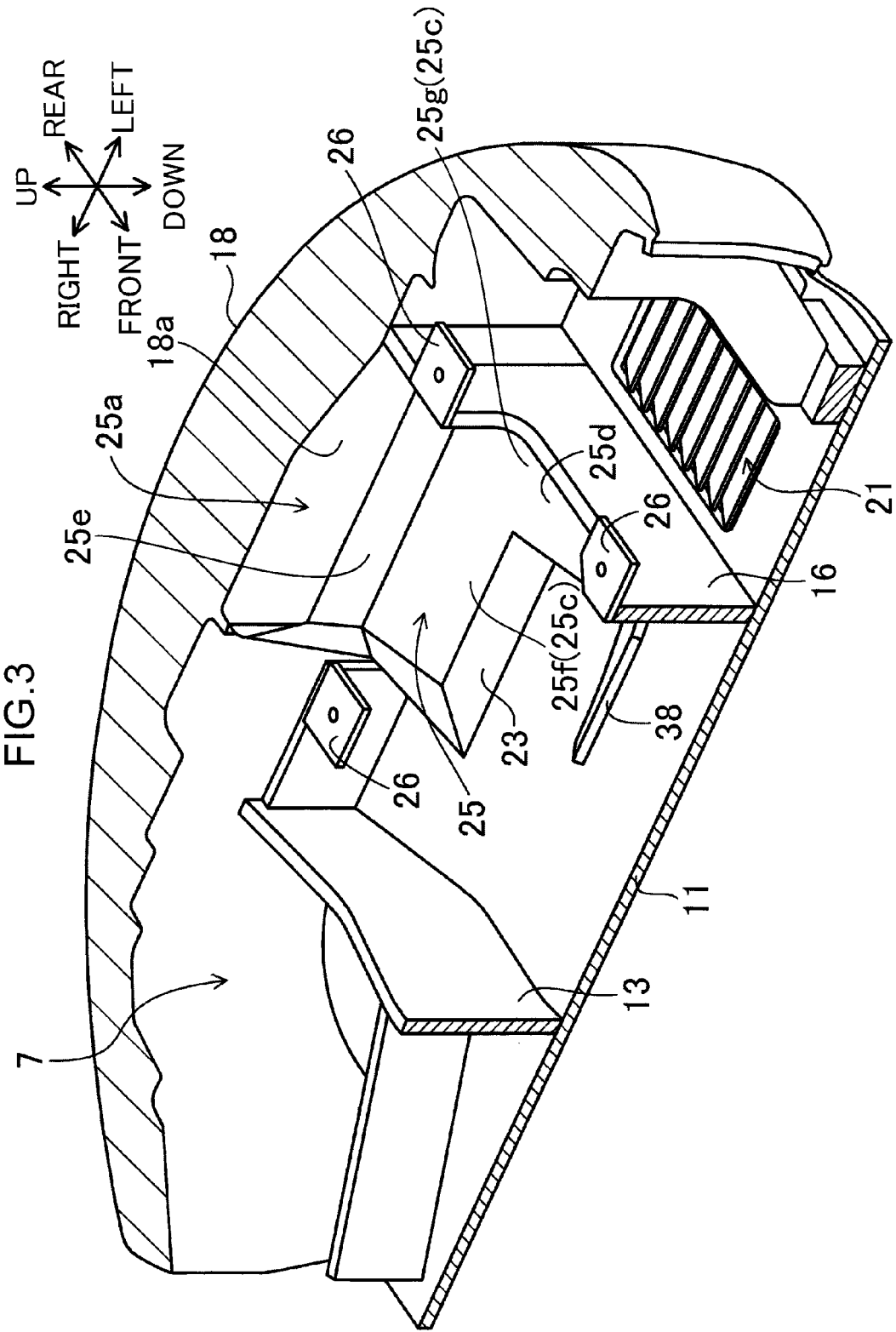
FIG. 3 is a schematic perspective view illustrating a lower portion of an engine room.
Figure 4:
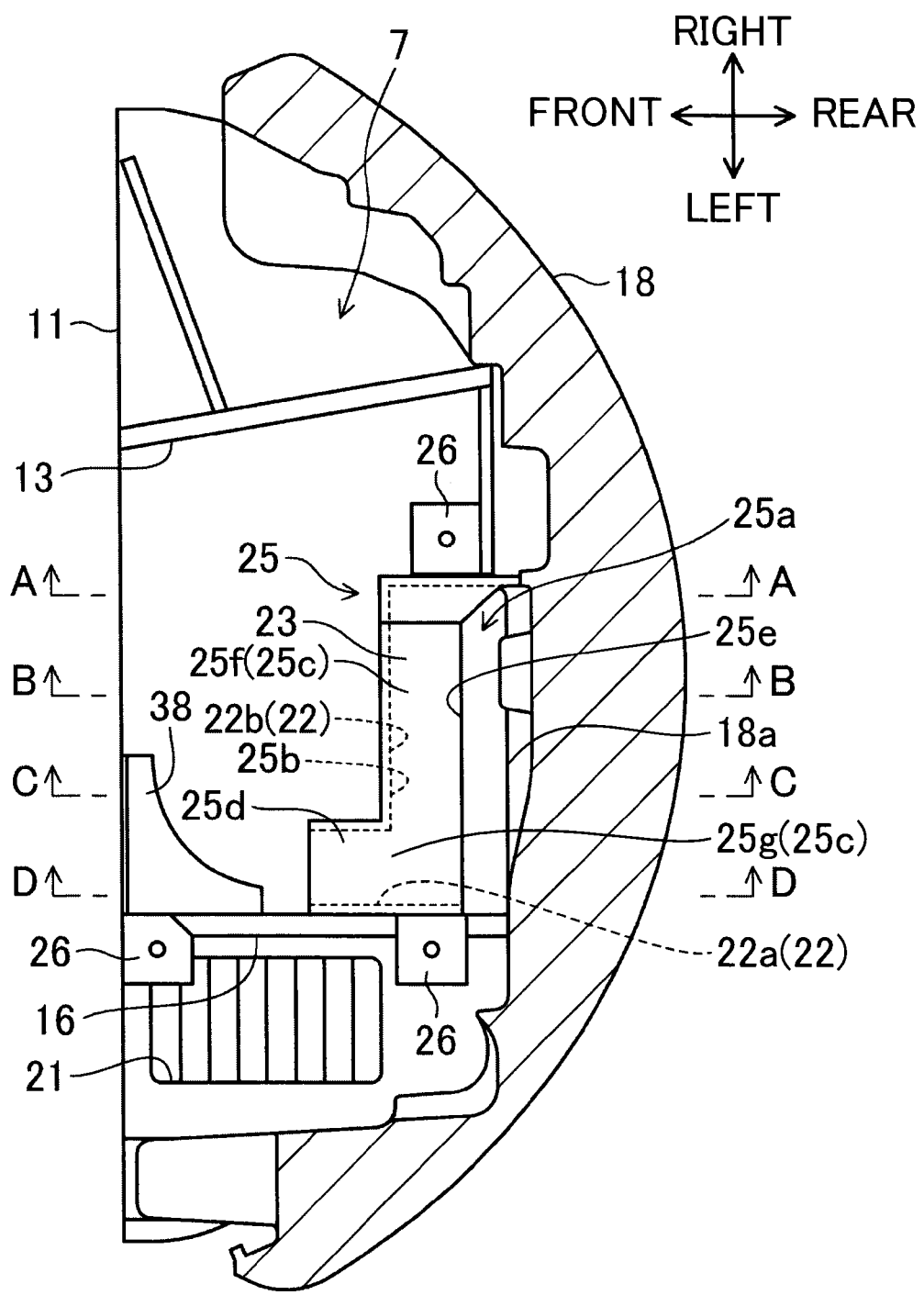
FIG. 4 is a schematic plan view illustrating the lower portion of the engine room viewed from the top.

A duct cover 23 is installed over the bottom plate 11 so as to cover the second air outlet 22. As illustrated in FIG. 3 and FIG. 4, the duct cover 23 is made of an assembling member formed by combining a plurality of metal plate members. The assembling member has a plurality of surfaces. The duct cover 23, the counter weight 18, and the third vertical plate 16 together form the exhaust air duct 25 extending along the second air outlet 22. The exhaust air duct 25 is installed in the engine room 7. The exhaust air duct 25 guides an air flow to the second air outlet 22.

A front portion and a right side portion of the exhaust air duct 25 are formed by the duct cover 23. A rear portion of the exhaust air duct 25 is formed by the inner wall surface 18a of the counter weight 18. A left side portion of the exhaust air duct 25 is formed by a right side surface of the third vertical plate 16.

The exhaust air duct 25 includes a duct base portion 25c and an extension portion 25e.

The duct base portion 25c is installed over the bottom plate 11 so as to cover the second air outlet 22. A lower end portion of the duct base portion 25c is joined to a peripheral portion of the second air outlet 22 of the bottom plate 11. The duct base portion 25c includes a lower opening 25b formed at a lower end of the duct base portion 25c so as to be open downward. The lower opening 25b communicates with the second air outlet 22. The duct base portion 25c is disposed in a range extending from a position located lower than the engine 31 and behind the engine 31 to a position located immediately under the engine 31.

The duct base portion 25c includes a major opening portion covering portion 25f and a wide-portion covering portion 25g. The major opening portion covering portion 25f covers the major opening portion 22b of the second air outlet 22. The wide-portion covering portion 25g covers the wide portion 22a of the second air outlet 22. The wide-portion covering portion 25g covers the wide portion 22a at the position located immediately under the engine 31. That is, a region extending from a front portion of the wide-portion covering portion 25g to a specific position in the rear side is disposed in a space located immediately under the engine 31. The region covers a portion of the wide portion 22a located immediately under the engine 31.

The front portion of the wide-portion covering portion 25g protrudes further frontward from the front end of the major opening portion covering portion 25f. That is, the wide-portion covering portion 25g includes a projection portion 25d that protrudes further frontward from the front end of the major opening portion covering portion 25f. The projection portion 25d is formed by a portion of a left end portion of the duct cover 23, which protrudes further frontward from a front end of a portion forming the major opening portion covering portion 25f, and the third vertical plate 16. The projection portion 25d is disposed in a left end portion of a lower portion of the exhaust air duct 25 so as to correspond to a position of the wide portion 22a.

The extension portion 25e is a portion extending upward from the duct base portion 25c at a position behind the engine 31. The extension portion 25e includes an upper opening 25a formed in an upper end of the extension portion 25e. The upper opening 25a is open upward and is open to the inside of the engine room 7.

A ventilation flue that is a space in which an air flow flows is formed inside the exhaust air duct 25. The ventilation flue extends between the upper opening 25a and the lower opening 25b to provide communication between the upper opening 25a and the lower opening 25b.

An engine pedestal 26 is installed at each of four positions of members, such as the beam plate 15, the third vertical plate 16, and the like. The engine 31 is installed on the four engine pedestals 26.

Figure 5:
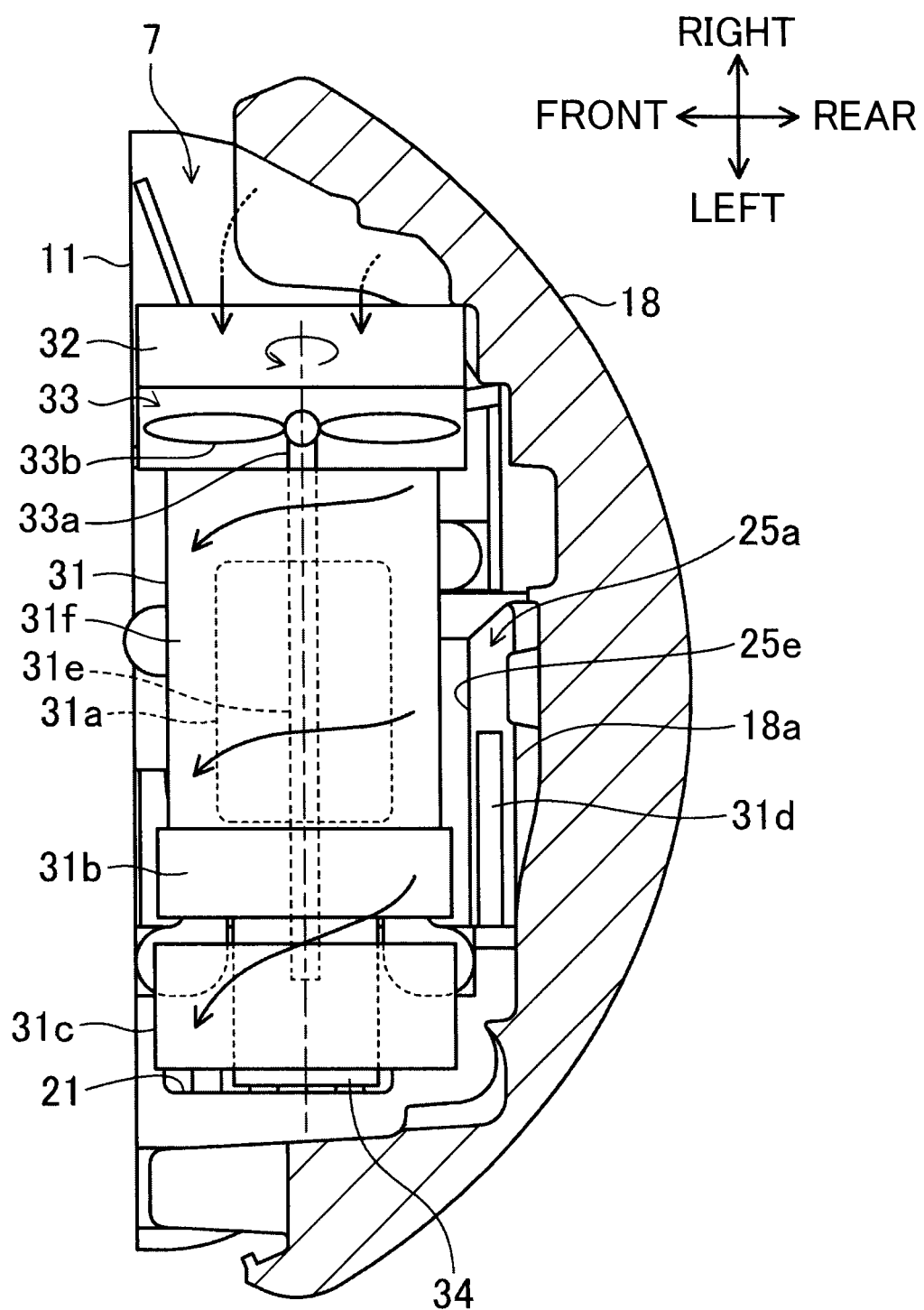
FIG. 5 is a schematic plan view illustrating the lower portion of the engine room in a state where an engine and the like are disposed, which corresponds to FIG. 4.
Figure 6:
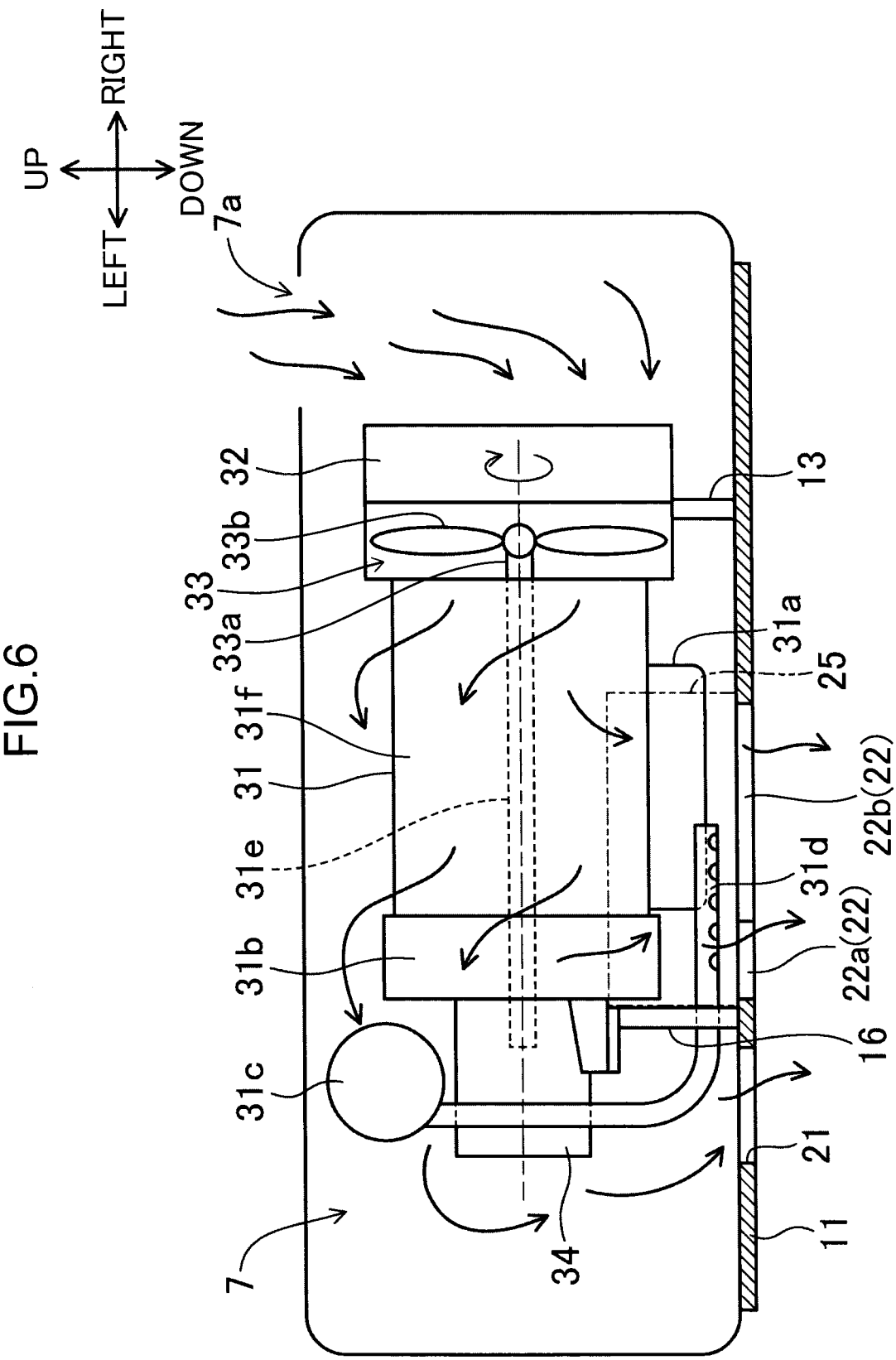
FIG. 6 is a schematic view illustrating the inside of the engine room in a state where an engine and the like are disposed, when viewed from the rear.
Figure 7A:
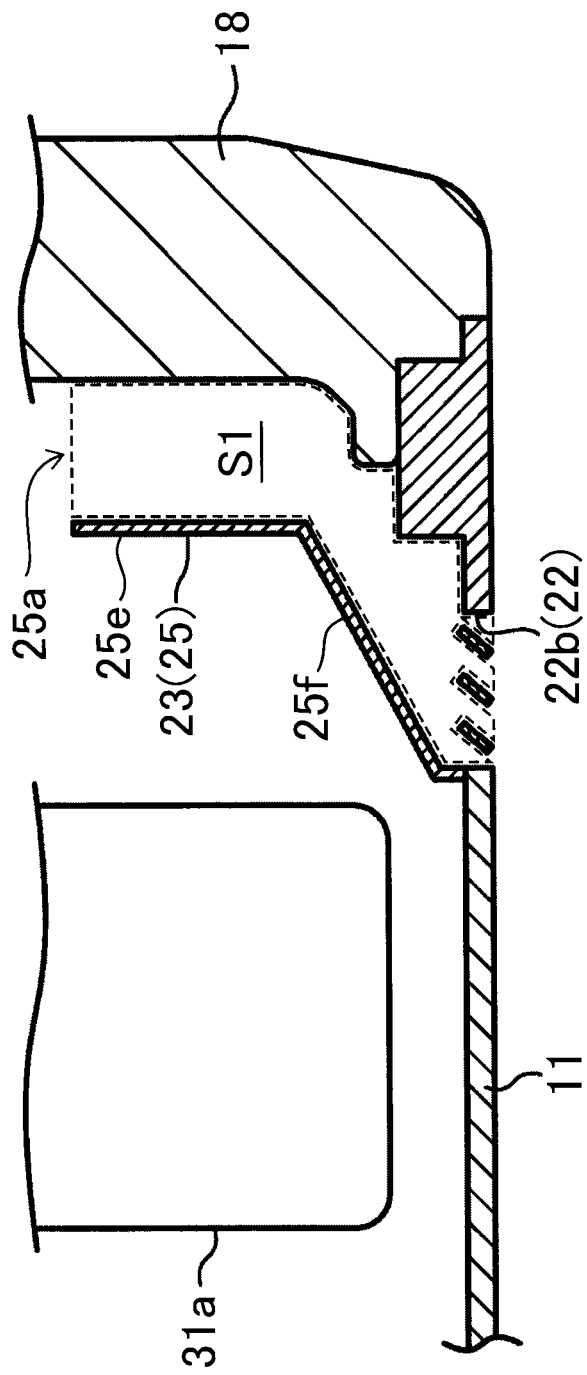
FIG. 7A is a schematic cross-sectional view taken along the line A-A of FIG. 4.
Figure 7B:
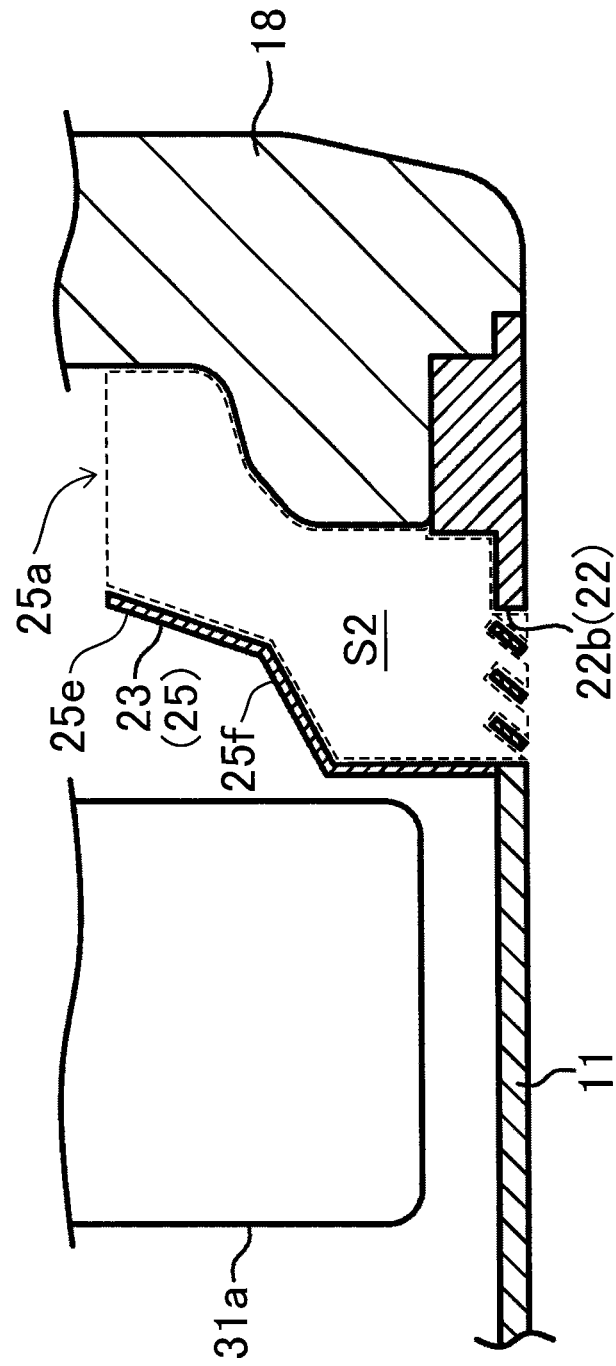
FIG. 7B is a schematic cross-sectional view taken along the line B-B of FIG. 4.

The engine 31 includes a drive shaft 31e. The engine 31 is laterally disposed in the engine room 7 as illustrated in FIG. 5 and FIG. 6 such that the drive shaft 31e extends in the left and right direction. The engine 31 includes an engine body 31f and a flywheel 31b. The engine body 31f is a portion that generates power. An oil pan 31a, which stores therein engine oil, is attached to the engine body 31f. The oil pan 31a protrudes downward from a lower portion of the engine body 31f. The flywheel 31b provides inertia to the rotation of a crankshaft (not illustrated) of the engine 31 to smoothen the rotation. The flywheel 31b is provided in a left end portion of the engine body 31f. The flywheel 31b projects around the engine body 31f when viewed in the left and right direction. That is, the flywheel 31b has an outer diameter that is slightly greater than the outer diameter of the engine body 31f.

The wide portion 22a of the second air outlet 22 and the wide-portion covering portion 25g of the exhaust air duct 25 are disposed at positions displaced from the oil pan 31a in the left and right direction. Specifically, the wide portion 22a and the wide-portion covering portion 25g are disposed at positions displaced to left from the oil pan 31a. Thus, interference between the oil pan 31a and the wide-portion covering portion 25g is not caused.

In the engine room 7, in addition to the engine 31, the heat exchanger 32, the axial fan 33, the hydraulic pump 34, and the like, are installed. The heat exchanger 32 and the axial fan 33 are installed in a right end portion of the engine room 7. The hydraulic pump 34 is installed in a left end portion of the engine room 7. The heat exchanger 32, the axial fan 33, the engine 31, and the hydraulic pump 34 are installed in series in this order from the right side to the left side.

An exhaust related device 31c is provided above the hydraulic pump 34. The exhaust related device 31c is a device associated with the engine 31. The exhaust related device 31c is provided in the middle of an exhaust pipe. The exhaust pipe guides exhaust gas exhausted from the engine 31. The exhaust pipe includes a last portion 31d corresponding to an end portion of the exhaust pipe located at an opposite side to the engine 31. The last portion 31d is a portion that discharges exhaust gas flowing through the exhaust pipe. The last portion 31d protrudes into the exhaust air duct 25. The last portion 31d is disposed above the second air outlet 22.

The heat exchanger 32 cools down a refrigerant, oil, or the like, in cooperation with the axial fan 33. Specifically, the axial fan 33 takes in outside air into the engine room 7 through an outside inlet 7a provided in a right end upper portion of the engine room 7 and makes the taken outside air pass through the heat exchanger 32. Thus, a refrigerant, or the like, circulating in the heat exchanger 32 exchanges heat with the outside air passing through the heat exchanger 32 and is thereby cooled down. That is, the refrigerant, or the like, circulating in the heat exchanger 32 is air-cooled.

In the engine room 7, an air flow flowing toward the left end portion of the engine room 7 from the right end portion of the engine room 7 is generated by an operation of the axial fan 33. Specifically, the axial fan 33 includes a rotating shaft 33a disposed so as to be coaxial with the drive shaft 31e of the engine 31 and also to be connected to the drive shaft 31e and a propeller 33b disposed so as to be coaxial with the rotating shaft 33a and also to be connected to the rotating shaft 33a. The rotating shaft 33a and the propeller 33b are disposed such that the axial directions thereof correspond to the left and right direction. The rotating shaft 33a rotates due to transmission of the rotation of the drive shaft 31e of the engine 31, and the propeller 33b rotates integrally with the rotating shaft 33a. Thus, the propeller 33b rotates clockwise when viewed from the right side of the axial fan 33, which is the windward side. The propeller 33b that rotates in the above-described manner generates an air flow flowing from the right side to the left side in the engine room 7. The generated air flow is directed to the outside of the engine room 7 through the first air outlet 21 and the second air outlet 22.

Note that the rotating shaft 33a and the propeller 33b do not necessarily have to be disposed coaxially with the drive shaft 31e. Also, the rotating shaft 33a does not necessarily have to be directly connected to the drive shaft 31e. For example, the rotating shaft 33a and the propeller 33b may be disposed at positions where the axis centers thereof are displaced from the axis center of the drive shaft 31e and may be separated from the drive shaft 31e. In this case, the rotating shaft 33a and the drive shaft 31e may be connected to each other via a transmission member that transmits the rotation of the drive shaft 31e. For example, a fan belt may be laid around the rotating shaft 33a and the drive shaft 31e and the rotation of the drive shaft 31e may be transmitted to the rotating shaft 33a via the fan belt so that the rotating shaft 33a and the propeller 33b are rotated.

Also, the rotating shaft 33a and the propeller 33b may be rotated by providing power of a motor, which is additionally provided, to the rotating shaft 33a. In this case, the rotating shaft 33a is disposed so as to be independent from the drive shaft 31e such that the torque of the drive shaft 31e is not transmitted to the rotating shaft 33a.

In the model of this embodiment, utilizing a small space between the rear portion of the engine 31 and the counter weight 18, the exhaust air duct 25 is provided. Since the counter weight 18 is made of a cast, the shape of the inner wall surface 18a of the counter weight 18 may be designed relatively freely. Therefore, in this embodiment, the rear portion of the exhaust air duct 25 is formed by the inner wall surface 18a of the counter weight 18, so that a small space is efficiently utilized to ensure a ventilation flue.

Furthermore, in this embodiment, the exhaust air duct 25 and the air outlet 22 are configured considering the arrangement of the engine 31 and the shape of the lower portion of the engine 31, and thus, the small engine room 7 is allowed to be efficiently ventilated.

Specifically, the efficiency of ventilation of the small engine room 7 is increased by utilizing the dead space provided immediately under the engine 31. A structure provided for this purpose will be specifically described below.

The right side of the space provided immediately under the engine 31 is blocked by the first vertical plate 13 and the left side of the space is blocked by the third vertical plate 16. Thus, the space provided immediately under the engine 31 is a dead space in which it is difficult to install a device. In this embodiment, utilizing the dead space, the second air outlet 22 is disposed. That is, the front portion of the second air outlet 22 is disposed immediately under the engine 31. Thus, a relatively large opening area is ensured as an opening area for the second air outlet 22 in the small engine room 7.

Furthermore, in this embodiment, a portion of the second air outlet 22 located at the leeward side is the wide portion 22a. Thus, the front and rear direction width of the wide portion 22a located at the leeward side in the second air outlet 22 is larger than the front and rear direction width of the major opening portion 22b located at the windward side in the second air outlet 22. Thus, the stagnation of an air flow at the leeward side is prevented. As a result, air flows smoothly.

The duct cover 23 that covers the second air outlet 22 is formed so as to spread along the lower portion of the engine 31, and thus, the space provided immediately under the engine 31 is efficiently utilized.

Specifically, as illustrated in FIGS. 7A-7D, the shape and arrangement of the duct cover 23 are set in accordance with the shapes and arrangements of the oil pan 31a and the flywheel 31b. That is, the projection portion 25d of the exhaust air duct 25, which is formed such that the upper wall thereof slopes downward forward, is disposed immediately under the flywheel 31b. Then, the projection portion 25d is disposed in a space provided immediately under the flywheel 31b such that the front end of the projection portion 25d is located substantially immediately under the drive shaft 31e of the engine 31.

The wide portion 22a has a large front and rear direction width and a large opening area, and thus, the amount of sound leakage via the wide portion 22a tends to increase, and also, an extraneous material tends to enter the engine room 7 via the wide portion 22a. However, the upper wall of the projection portion 25d is disposed so as to cover the wide portion 22a and to be close to the wide portion 22a above the wide portion 22a so that noise leakage and entrance of an extraneous material can be effectively reduced.

In this embodiment, as described above, the strength of the bottom plate 11 to which the load of the engine 31 as a heavy load is applied, can be ensured to a certain extent while realizing efficient discharge of air from the engine room 7. That is, the wide portion 22a is formed only in a portion of the second air outlet 22, and therefore, a drastic reduction in strength of the bottom plate 11 caused by an increase in opening area due to the wide portion 22a can be reduced, and the strength of the bottom plate 11 can be ensured.

The exhaust air duct 25 is designed such that the area of a cross section (a lateral cross section) of a space in the exhaust air duct 25 that is perpendicular to the left and right direction is substantially constant throughout the entire region of the exhaust air duct 25 in the left and right direction. For example, the respective areas of cross sections S1-S4 of the space in the exhaust air duct 25 illustrated in FIGS. 7A-7D are substantially the same. Note that each of the areas of the cross sections S1-S4 is the area of a region surrounded by a dashed line in the corresponding one of FIGS. 7A-7D. Specifically, the shape of the inner wall surface 18a of the counter weight 18 is designed in accordance with the shape of the duct cover 23 such that the area of the cross section of the space in the exhaust air duct 25 that is perpendicular to the left and right direction is constant throughout the entire region of the exhaust air duct 25 in the left and right direction.

The above-described design enables a smooth flow of air throughout the entire region of the ventilation flue in the exhaust air duct 25 from the left end thereof to the right end thereof. Thus, air flowing in the engine room 7 can be effectively guided in the ventilation flue of the exhaust air duct 25, and as a result, the air can be efficiently discharged from the second air outlet 22.

Furthermore, in this embodiment, in order to guide to the second air outlet 22 as much air flowing in the engine room 7 as possible, an opening that communicates with the ventilation flue in the exhaust air duct 25 is formed in a front end portion of the projection portion 25d.

Specifically, as illustrated in FIG. 7D, a front opening 37 that is open forward is provided in the front end portion of the projection portion 25d. A guide plate 38 is provided in front of the front opening 37. The guide plate 38 slopes downward rearward. The guide plate 38 is disposed such that the guide plate 38 and an upper wall of the projection portion 25d are in a symmetrical relationship in the front and rear direction.

Figure 8:
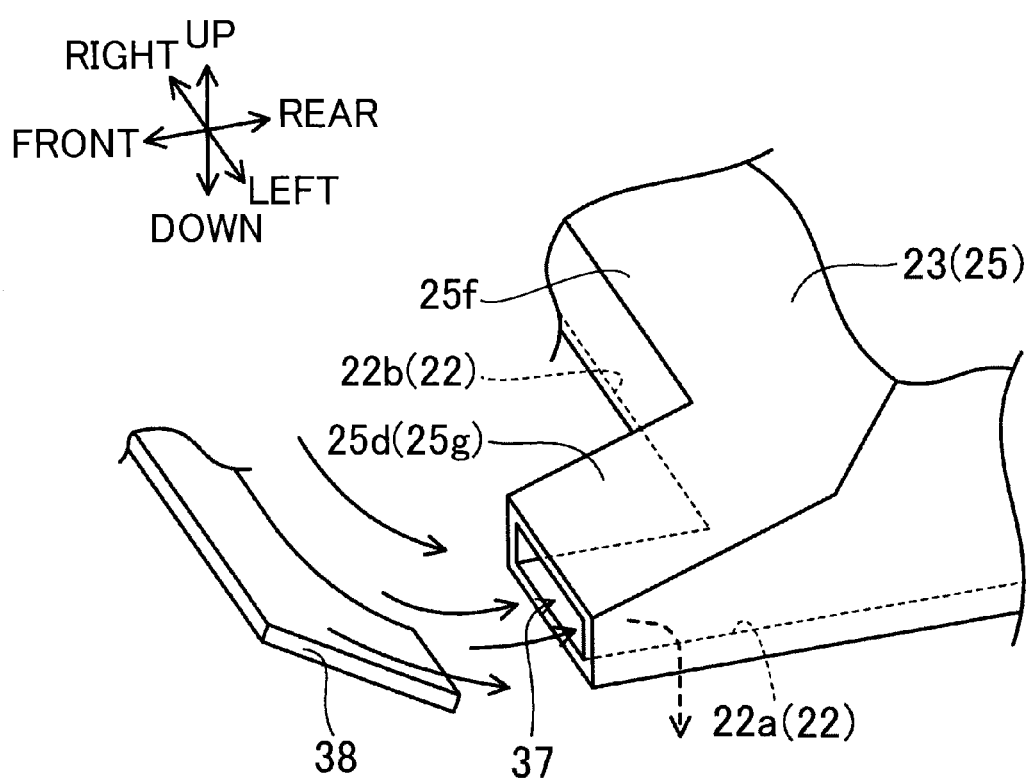
FIG. 8 is a partial schematic perspective view of an exhaust air duct and a guide plate, illustrating a state where an air flow is introduced into the exhaust air duct from a front opening.

As illustrated in FIG. 8, air flowing in the space provided immediately under the engine 31 swirls rearward. Thus, the front opening 37 faces the air flow direction. Furthermore, the air is smoothly guided to the front opening 37 by the guide plate 38. By these factors, a part of the air flowing in the engine room 7 goes through the front opening 37 and is discharged from the second air outlet 22.

Note that a work machine according to the present invention is not limited to the above-described embodiment and also includes various other configurations.

For example, in the above-described embodiment, not only the second air outlet 22, which is an example air outlet according to the present invention, but also the first air outlet 21 are provided in the bottom plate 11 that forms the bottom surface of the engine room 7; however, only the second air outlet 22 may be provided in the bottom plate 11 that forms the bottom surface of the engine room 7 and the first air outlet 21 may be omitted. As another option, another air outlet, such as a third air outlet, may be further provided in the bottom plate 11 that forms the bottom surface of the engine room 7. The direction in which the air flows in the engine room 7 may be toward the left or the right. The wide portion 22a may be formed in a portion of the second air outlet 22 located at the windward side.

SUMMARY OF EMBODIMENT

The above-described embodiment will be summarized as follows.

A work machine according to the above-described embodiment includes a lower propelling body and a machine body mounted on the lower propelling body, the machine body including an engine room in a rear portion thereof, the machine body includes a bottom plate that forms a bottom surface of the engine room and has an air outlet formed therein, a fan that is installed in the engine room to generate an air flow flowing in a left and right direction of the machine body in the engine room, an engine that has a drive shaft and is laterally disposed in the engine room such that the drive shaft extends in the left and right direction of the machine body, and an exhaust air duct that is installed in the engine room to guide the air flow to the air outlet, the air outlet includes a major opening portion that extends along a lower portion of a rear portion of the engine in the left and right direction of the machine body, and a wide portion that is disposed with the major opening portion side by side in the left and right direction of the machine body so as to be connected to the major opening portion, the wide portion including a portion located immediately under the engine and having a greater width in a front and rear direction of the machine body than a width of the major opening portion in the front and rear direction of the machine body, the exhaust air duct includes a duct base portion that is installed on the bottom plate so as to cover the air outlet, the duct base portion including a lower opening that is provided at a lower end of the duct base portion to communicate with the air outlet, and an extension portion that extends upward from the duct base portion at a position behind the engine and has an upper opening that is provided at an upper end thereof and is open upward, the exhaust air duct defines a ventilation flue in the exhaust air duct, the ventilation flue communicating the upper opening with the lower opening between the upper opening and the lower opening, and the duct base portion includes a wide-portion covering portion that covers the wide portion at a position immediately under the engine.

That is, in this work machine, the engine is laterally disposed in the engine room disposed in the rear portion of the machine body, and the fan that generates an air flow that flows in the left and right direction along the engine is installed in the engine room. The air is guided to the ventilation flue in the exhaust air duct installed in the engine room so as to be discharged from the air outlet that is open in the bottom plate that forms the bottom surface of the engine room.

In this work machine, the air outlet includes the wide portion that has a greater front and rear direction width than the front and rear direction width of the major opening portion, and thus, an opening area of the air outlet is increased due to the wide portion, so that the air is easily discharged. Moreover, the wide portion includes a portion located immediately under the engine, and the wide-portion covering portion of the duct base covers the wide portion at the position located immediately under the engine, and thus, the air can be guided to the air outlet having an increased opening area by the exhaust air duct and thus efficiently discharged, while avoiding interference between the engine and another device that are disposed in the small engine room and the exhaust air duct by efficiently utilizing a dead space provided immediately under the engine. Accordingly, in this work machine, efficiently utilizing a small space in the engine room, air can be efficiently discharged from the bottom portion of the engine room.

Also, in this work machine, as described above, the strength of the bottom plate to which a load of the engine as a heavy load is applied can be ensured to a certain extent, while efficient discharge of air from the engine room is realized. That is, the wide portion is formed only in a part of the air outlet, and therefore, a drastic reduction in strength of the bottom plate caused by an increase in opening area due to the wide portion can be reduced, and the strength of the bottom plate can be ensured.

The wide portion is preferably disposed at a leeward side relative to the major opening portion.

Thus, the stagnation of air flow at the leeward side can be prevented. As a result, air smoothly flows in the ventilation flue in the exhaust air duct, and the air can be smoothly discharged to the outside of the engine room from the air outlet.

Also, the exhaust air duct preferably defines a space inside the exhaust air duct, the space having a cross section perpendicular to the left and right direction of the machine body, and the exhaust air duct is preferably formed such that the cross section of the space has a constant area throughout an entire region of the exhaust air duct in the left and right direction of the machine body.

Thus, a smooth flow of air throughout the entire region of the ventilation flue that is a space in the exhaust air duct from the left end thereof to the right end thereof is enabled. Thus, air flowing in the engine room can be effectively guided into the exhaust air duct, and as a result, the air can be efficiently discharged from the air outlet.

Furthermore, the machine body preferably includes a casted counter weight disposed in the rear portion of the machine body, and the counter weight preferably has an inner wall surface that forms a rear portion of the exhaust air duct.

The shape of an inner surface of the counter weight formed by casting can be relatively freely designed, and therefore, with this configuration, efficiently utilizing a small space, an exhaust air duct in which an area of a cross section of a space in the exhaust air duct that is perpendicular to the left and right direction is substantially constant throughout an entire region of the exhaust air duct in the left and right direction can be easily formed. Furthermore, a lower portion of the exhaust air duct protrudes forward, and accordingly, a lower portion of the counter weight can be made to protrude forward. Thus, increase in the weight of the counter weight is allowed, the position of the center of gravity of the counter weight is lowered, and therefore, increased stability can be achieved.

The exhaust air duct may have a front end portion provided with an opening that communicates with the ventilation flue.

Thus, the air flow in the engine room can be taken into the ventilation flue in the exhaust air duct not only from the upper portion of the exhaust air duct but also from the front end portion of the exhaust air duct. As a result, the air in the engine room can be more efficiently discharged from the air outlet.

As described above, with the work machine according to the above-described embodiment, air can be efficiently discharged from the bottom portion of the engine room utilizing the small space in the engine room.

This application is based on Japanese Patent application No. 2013-226988 filed in Japan Patent Office on Oct. 31, 2013, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

The invention claimed is:

1. A work machine, comprising:
a lower propelling body; and
a machine body mounted on the lower propelling body, the machine body including an engine room in a rear portion thereof, wherein
the machine body includes: a bottom plate that forms a bottom surface of the engine room and has an air outlet formed therein; a fan that is installed in the engine room to generate an air flow flowing in a left and right direction of the machine body in the engine room; an engine that has a drive shaft and is laterally disposed in the engine room such that the drive shaft extends in the left and right direction of the machine body; and an exhaust air duct that is installed in the engine room to guide the air flow to the air outlet,
the air outlet includes a major opening portion that extends along a lower portion of a rear portion of the engine in the left and right direction of the machine body, and a wide portion that is disposed with the major opening portion side by side in the left and right direction of the machine body so as to be connected to the major opening portion, the wide portion including a portion located immediately under the engine and having a greater width in a front and rear direction of the machine body than a width of the major opening portion in the front and rear direction of the machine body,
the exhaust air duct includes a duct base portion that is installed on the bottom plate so as to cover the air outlet, the duct base portion including a lower opening that is provided at a lower end of the duct base portion to communicate with the air outlet, and an extension portion that extends upward from the duct base portion at a position behind the engine and has an upper opening that is provided at an upper end thereof and is open upward,
the exhaust air duct defines a ventilation flue in the exhaust air duct, the ventilation flue communicating the upper opening with the lower opening between the upper opening and the lower opening, and
the duct base portion includes a wide-portion covering portion that covers the wide portion at a position immediately under the engine.

2. The work machine according to claim 1, wherein the wide portion is disposed at a leeward side relative to the major opening portion.

3. The work machine according to claim 1, wherein the exhaust air duct has an inner surface which defines a space inside the exhaust air duct, the space having a cross section perpendicular to the left and right direction of the machine body, and the exhaust air duct is formed such that the cross section of the space has a constant area throughout an entire region of the exhaust air duct in the left and right direction of the machine body.

4. The work machine according to claim 3, wherein
the machine body includes a casted counter weight disposed in the rear portion of the machine body, and
the counter weight has an inner wall surface that forms a rear portion of the exhaust air duct.

5. The work machine according to claim 1, wherein the exhaust air duct has a front end portion provided with an opening that communicates with the ventilation flue.

* * * * *